US006562896B2

(12) United States Patent
Lysek et al.

(10) Patent No.: US 6,562,896 B2
(45) Date of Patent: *May 13, 2003

(54) NON-HALOGENATED POLYAMIDE COMPOSITION

(75) Inventors: Bruce A. Lysek, Cantonment, FL (US);
Russell F. Dunn, Cantonment, FL (US);
Cary J. Kostakes, Hoffman Estates, IL (US)

(73) Assignee: Solutia Inc., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,559

(22) Filed: Dec. 9, 1999

(65) Prior Publication Data

US 2002/0013423 A1 Jan. 31, 2002

Related U.S. Application Data

(60) Provisional application No. 60/111,691, filed on Dec. 10, 1998.

(51) Int. Cl.$^7$ ................................................ C08L 77/00
(52) U.S. Cl. ........................................ 524/538; 525/424
(58) Field of Search ........................... 524/538; 525/424

(56) References Cited

U.S. PATENT DOCUMENTS

| | | | | |
|---|---|---|---|---|
| 4,180,496 A | | 12/1979 | Yanagimoto et al. | 260/45.8 |
| 4,298,518 A | | 11/1981 | Ohmura et al. | 260/32.6 |
| 4,317,766 A | | 3/1982 | Kawasaki et al. | 524/101 |
| 4,321,189 A | | 3/1982 | Ohshita et al. | 524/101 |
| 4,363,890 A | * | 12/1982 | Ohshita et al. | 524/101 |
| 4,789,698 A | | 12/1988 | Bonten et al. | 524/100 |
| 4,866,115 A | * | 9/1989 | Betz et al. | 524/135 |
| 5,135,974 A | | 8/1992 | Moore | 524/101 |

FOREIGN PATENT DOCUMENTS

| | | | | |
|---|---|---|---|---|
| EP | 0 017 925 A | | 10/1980 | C08L/77/00 |
| EP | 0 461 097 A | | 12/1991 | C08K/5/00 |

* cited by examiner

*Primary Examiner*—Ana Woodward
(74) *Attorney, Agent, or Firm*—Howrey Simon Arnold & White, LLP; John P. Foryt

(57) ABSTRACT

A polyamide composition including (a) at least one polyamide other than nylon 2,2, or a copolymer of at least two polyamide repeating units, neither of which is nylon 2,2, (b) melamine cyanurate, and (c) a nucleating agent such as nylon 2,2 in an amount effective to cause nucleation of the polyamide of (a), has good flame retarding properties and relatively short set-up times in molding processes.

13 Claims, No Drawings

NON-HALOGENATED POLYAMIDE COMPOSITION

This application claims the benefit of provisional application S. No. 60/111,691, filed Dec. 10, 1998.

BACKGROUND OF THE INVENTION

The present invention relates to the non-halogenated polyamide compositions, and in particular to such compositions that have flame retardant properties.

Polyamides such as nylon have a variety of commercial uses. One important use is as a resin for molding articles. It is often important for molded polyamide articles to have flame retardant properties. The means used in the past for achieving flame retardancy in polyamide compositions have presented various problems or shortcomings.

Incorporation of halogen compounds can improve flame retardancy, but does not offer the most environmentally friendly system. One problem for example is the reduction in mold life due to the corrosive nature of halogens. Non-halogenated flame retardant (NHFR) nylon compositions can be created by incorporating melamine cyanurate. NHFR nylon products prepared with a copolymer base resin have a high degree of toughness, but the copolymer causes the composition to have a longer set-up or cure time in molding processes. A fast set-up time is desired in molding processes in order to increase throughput and thereby reduce manufacturing cost. Lowering the relative viscosity (RV) of the base copolymer resin will reduce set-up time, but also diminishes the flame retardancy (as measured for example by the Underwriters' Laboratories UL-V0 Vertical Flame Test).

A need exists for improved polyamide compositions that have both good flame retardancy properties and relatively fast set-up times in molding processes, while also having other desirable properties such as toughness.

SUMMARY OF THE INVENTION

One aspect of the present invention is a polyamide composition comprising (a) at least one polyamide other than nylon 2,2, or a copolymer of at least two polyamide repeating units, neither of which is nylon 2,2, (b) melamine cyanurate, and (c) a nucleating agent in an amount effective to cause nucleation of the polyamide of (a). In a preferred embodiment, the nucleating agent is nylon 2,2. The nylon 2,2 preferably is present in an amount between about 0.001% and about 0.1% by weight, more preferably in an amount between about 0.01% and about 0.05% by weight.

The polyamide of (a) can for example be nylon 6,6. As another example it can be a copolymer of nylon 6,6 and nylon 6. Preferably the polyamide has a relative viscosity (RV) of from about 40 to about 55. An RV in the range of about 44–50 is especially preferred.

The composition can further comprise one or more fillers, reinforcing agents, stabilizers, dyes, other flame retarding agents, mold-release agents, plasticizers, pigments, ultraviolet light absorption agents, antistatic agents, or lubricants.

Preferably the copolymer is from about 75–95% by weight of the composition, the melamine cyanurate is from about 1–15% by weight of the composition, and the nucleating agent (e.g. nylon 2,2) is from about 0.001–0.1% by weight of the composition. In a particularly preferred embodiment, the copolymer is from about 85–95% by weight of the composition, the melamine cyanurate is from about 5–10% by weight of the composition, and the nylon 2,2 is from about 0.01–0.05% by weight of the composition.

Another aspect of the present invention is a process for producing nucleated polyamide. The process comprises cooling a molten polyamide other than nylon 2,2 in the presence of (a) melamine cyanurate and (b) a nucleating agent in an amount effective to cause nucleation of the polyamide. In various embodiments of the process, the reactants and proportions can be as described above with respect to the composition.

The compositions of the present invention exhibit commercially desirable flame retardancy, toughness, and flow, yet also have relatively short set-up times in molding and thus reduced molding cycle times. In particular, compositions of the present invention can meet the Underwriters' Labs UL-V0 flame retardancy test while maintaining relatively short set-up times in molding operations. This improvement in molding cycle time increases manufacturing throughput and reduces unit cost.

DESCRIPTION OF SPECIFIC EMBODIMENTS

Compositions of the present invention contain one or more polyamides that are condensation polymers obtained by the polycondensation of amino carboxylic acids or of mixtures of diamines and dicarboxylic acids including interpolyamides obtained by the polycondensation of different polyamide forming components. Suitable polyamides include nylon 6 and nylon 6,6. Other suitable polyamides are copolymers of at least two polyamide repeating units, or blends or alloys of two or more polyamides. Suitable copolymers include copolymers of nylon 6,6 with nylon 6, nylon 6IA, nylon 6TA, and the like.

Compositions of the present invention also include melamine cyanurate. A variety of ways of providing this compound in polymer compositions are taught in U.S. Pat. Nos. 4,180,496, 4,298,518, 4,317,766, 4,321,189, 4,363,890, 4,789,698, and 5,135,974, each of which is incorporated here by reference. In general, the melamine cyanurate for the final composition can be provided by incorporating that compound directly with the polyamide and other ingredients before heating, or alternatively precursor compounds can be incorporated that will react to form melamine cyanurate in situ during elevated temperature processing.

Compositions of the present invention also include a nucleating agent, preferably a non-heterogeneous nucleating agent. A presently preferred nucleating agent is nylon 2,2. Other suitable non-heterogeneous nucleating agents include as nylon 4,6, and the compound formed from the reaction of benzene phosphinic acid and aluminum stearate. Still other suitable nucleating agents include heterogeneous nucleating agents such as titanium dioxide and calcium fluoride.

The nucleating agent (e.g., nylon 2,2) and the melamine cyanurate or precursor compounds therefor can be incorporated into the polyamide before, during, or after the polycondensation step. For example, nylon 2,2 and melamine cyanurate can be added to molten polyamide. Alternatively, they can be mixed with solid polyamide and the mixture then melted. As another alternative, solid polyamide in the form of e.g., lumps, pellets, or chips, can be coated or dusted with the ingredients and then melted.

Compositions of the present invention can further comprise one or more polymer additives such as fillers, reinforcing agents, stabilizers, dyes, other flame retarding agents, mold-release agents, plasticizers, pigments, ultraviolet light absorption agents, antistatic agents, and lubricants.

Compositions of the present invention can be molded into articles of various shapes using equipment and methods that are well known. The present invention is particularly useful for engineering thermoplastic applications that require high flame retardancy.

A specific example of a moldable, flame-retardant nylon composition of the present invention is one that comprises nylon 6/nylon 6,6 copolymer (about 91% by weight), melamine cyanurate (about 7%), and nylon 2,2 (about 0.02%), plus optionally one or more other polymer additives as described above. The copolymer can, for example, comprise about 89% by weight nylon 6,6 and about 11% nylon 6, plus about 0.05% acetic acid.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A polyamide composition comprising (a) at least one polyamide other than nylon 2,2, or a copolymer of at least two polyamide repeating units, neither of which is nylon 2,2, said polyamide or copolymer having a relative viscosity of about 40 to about 55, (b) melamine cyanurate, and (c) a nucleating agent in an amount effective to cause nucleation of the polyamide of (a), wherein said composition can achieve a V0 flame retardancy rating.

2. The composition of claim 1 where the nucleating agent is nylon 2,2.

3. The composition of claim 2 where the nylon 2,2 is present in an amount between about 0.001% and about 0.1% by weight.

4. The composition of claim 3 where the nylon 2,2 is present in an amount between about 0.01% and about 0.05% by weight.

5. The composition of claim 1 where the polyamide of (a) is nylon 6,6.

6. The composition of claim 1 where the copolymer of (a) is a copolymer of nylon 6,6 and nylon 6.

7. The composition of claim 1 further comprising an additional material selected from the group consisting of fillers, reinforcing agents, stabilizers, dyes, other flame retarding agents, mold-release agents, plasticizers, pigments, ultraviolet light absorption agents, antistatic agents, or lubricants.

8. The composition of claim 1 wherein the relative viscosity is in the range of about 44–50.

9. A polyamide composition comprising (a) a copolymer of nylon 6,6 and nylon 6, said copolymer having a relative viscosity of about 40 to about 55, (b) melamine cyanurate, and (e) nylon 2,2 in an amount effective to cause nucleation of the copolymer, wherein said polyamide composition can achieve a V0 flame retardancy rating.

10. The composition of claim 9 where the copolymer is from about 75–95% by weight of the composition, the melamine cyanurate is from about 1–15% by weight of the composition, and the nylon 2,2 is from about 0.001–0.1% by weight of the composition.

11. The composition of claim 10 where the copolymer is from about 85–95% by weight of the composition, the melamine cyanurate is from about 5–10% by weight of the composition, and the nylon 2,2 is from about 0.01–0.05% by weight of the composition.

12. The composition of claim 11 further comprising an additional material selected from the group consisting of fillers, reinforcing agents, stabilizers, dyes, other flame retarding agents, mold-release agents, plasticizers, pigments, ultraviolet light absorption agents, antistatic agents, or lubricants.

13. The composition of claim 9 wherein the relative viscosity is in the range of about 44–50.

* * * * *